United States Patent
Decker et al.

(10) Patent No.: US 6,506,498 B2
(45) Date of Patent: Jan. 14, 2003

(54) TRANSLUCENT HIGH-TEMPERATURE POWDER COATINGS

(75) Inventors: Owen H. Decker, Wyomissing, PA (US); Charles P. Tarnoski, Sinking Spring, PA (US); Lee F. Spencer, Lebanon, PA (US); Roy M. Berstler, Hamburg, PA (US); James G. Fotiou, Reading, PA (US)

(73) Assignee: Rohm and Haas Company, Philadelphia, PA (US)

( * ) Notice: Subject to any disclaimer, the term of this patent is extended or adjusted under 35 U.S.C. 154(b) by 16 days.

(21) Appl. No.: 09/810,691

(22) Filed: Mar. 16, 2001

(65) Prior Publication Data

US 2001/0020059 A1 Sep. 6, 2001

Related U.S. Application Data

(62) Division of application No. 09/289,536, filed on Apr. 9, 1999, now Pat. No. 6,248,824.

(51) Int. Cl.[7] .......................... B32B 25/20; C08K 3/36; C08L 83/04
(52) U.S. Cl. .................. 428/447; 428/203; 428/323; 428/324; 428/325; 428/330; 428/331; 106/287.1; 106/600; 106/626; 106/636; 106/DIG. 3; 524/442; 524/449; 524/492; 524/493; 524/494; 524/588; 524/904; 525/474; 528/14; 528/19
(58) Field of Search ................................. 524/904, 492, 524/449, 493, 494, 442, 588; 106/600, 626, 636, DIG. 3, 157.1; 428/203, 323, 324, 325, 330, 331, 447; 525/474; 528/14, 19

(56) References Cited

U.S. PATENT DOCUMENTS

| | | | | |
|---|---|---|---|---|
| 5,135,407 A | * | 8/1992 | Berends ...................... | 439/236 |
| 5,422,396 A | * | 6/1995 | Daly et al. .................. | 428/447 |
| 5,759,647 A | * | 6/1998 | Kuroda et al. ......... | 138/DIG. 7 |
| 5,962,568 A | * | 10/1999 | Decker et al. .............. | 524/440 |
| 5,998,560 A | * | 12/1999 | Decker et al. .............. | 524/431 |

* cited by examiner

*Primary Examiner*—Robert Dawson
*Assistant Examiner*—Jeffrey B. Robertson

(57) ABSTRACT

Coating powders are provided which provide high-temperature, translucent coatings useful for light-emitting devices such as incandescent bulbs. The coating powders comprise a binder, at least 90 wt % up to 100 wt % of which is a silicone resin. The coating powders are filled with between about 10 and about 50 phr of fillers selected from the group consisting of needle-like calcium metasilicate, mica, rod-like glass particles, and mixtures thereof, the fillers having aspect ratios between about 8 and about 40.

9 Claims, No Drawings

TRANSLUCENT HIGH-TEMPERATURE POWDER COATINGS

The present application is a Division of U.S. Application Ser. No. 09/289,536, filed on Apr. 9, 1999, now U.S. Pat. No. 6,248,824 B1.

The present invention is directed to coating powders which produce translucent coatings particularly suitable for coating light-emitting devices, such as incandescent light bulbs.

BACKGROUND OF THE INVENTION

High-temperature, light-emitting devices, such as incandescent light bulbs are conventionally coated for translucency with liquid coatings comprising silicone resins in organic solvents. There is a general need to replace such hazardous and polluting coatings with non-hazardous and non-polluting powder coatings.

Powder coating compositions which yield transparent or translucent coatings are well known in the art. Typical organic binder materials for such coatings are epoxy, polyester, and acrylic resins. Unfortunately, coatings based on these organic binder systems darken and decompose upon prolonged exposure at typical incandescent operating temperatures of 300 to 700° F. (149 to 371° C.) and thus are not useful for light-emitting devices. Coatings containing blends of silicones and significant levels of organic binders, such as those disclosed in U.S. Pat. Nos. 5,684,066 to Eklund and 4,877,837 to Reisling also discolor and similarly are not useful for light-emitting devices.

Coating powders based totally on silicone resins or substantially entirely on silicone resins are known. For example, Daly et al. in U.S. Pat. No. 5,422,396 disclose in a "comparative example" a 100% silicone resin based on Dow Corning 6-2230 silicone resin. The "comparative example" formulation in Daly et al. contained 80 phr (parts per hundred resin by weight) mica. Although silicone-based powder coatings having as low as 40 phr mica or other reinforcing filler have been described, higher levels such as 60 phr and upward are generally used in high-temperature coatings. Below about 60 phr filler levels, coatings tend to be insufficiently reinforced for high-temperature use as such coatings tend to crack and peel at high temperatures.

Silicone coatings containing 60 to 80 phr and upward filler, such as mica and/or wollastonite (calcium metasilicate) are resistant to cracking and peeling at high temperatures. However, such fillers contribute to opacity and yellowing of the coatings, and filler levels of 60 phr give coatings which are too rough and too opaque to be generally useful for light-emitting devices.

It is a general object of the invention to provide coating powders for producing translucent coatings on high-temperature substrates, such as light-emitting devices including incandescent bulbs.

SUMMARY OF THE INVENTION

In accordance with the invention there are provided coating powders which provide high-temperature, translucent coatings useful for light-emitting devices such as incandescent bulbs. The coating powders comprise a binder, at least 90 wt %, preferably at least 95 wt % up to 100 wt % of which is a silicone resin. The coating powders are filled with between about 10 and about 50 phr, preferably between about 20 and about 40 phr, most preferably between about 25 and about 35 phr of fillers selected from the group consisting of needle-like calcium metasilicate, mica, rod-like glass particles, and mixtures thereof, the fillers having aspect ratios between about 8 and about 40, preferably between about 10 and about 25. The high aspect ratio of the fillers provide high-temperature reinforcement to the coatings at use levels sufficiently low to provide sufficient light transmittance for use with light-emitting devices.

The invention provides light-emitting devices, such as glass incandescent bulbs, having coatings derived from silicone-based coating powders, such coatings providing light transmittance at 1 mil thicknesses of at least 50%, preferably at least 80%.

The invention further provides coating powders having binders which are at least 90 wt % silicone, preferably at least 95 wt % silicone and which contain between about 0.05 and about 3 phr of zinc dialkylcarboxylate wherein the alkylcarboxylate ligands contain between 6 and 20 carbon atoms. Preferably, the alkylcarboxylate ions are branched at the carbon alpha to the carboxylate group. Such a catalyst is zinc neodecanoate.

DETAILED DESCRIPTION OF CERTAIN PREFERRED EMBODIMENTS

Herein, unless otherwise noted, percentages are by weight. The resins in the coating powders are calculated at 100%, and other components are expressed as percentages relative to 100% resin.

Heretofore, fillers such as mica and calcium metasilicate used for high-temperature, silicone-based coatings had relatively low aspect ratios, e.g., 5:1 and 3:1 being typical. The aspect ratio of needle-like wollastonite and rod-like glass particles are the ratio of length to width or diameter. The aspect ratio of platelet-like mica particles is the ratio of the diameter to the thickness. In respect to aspect ratios, it is understood that these are average aspect ratios of the individual particles. Surprisingly, it is found that by using fillers with higher aspect ratios, enhanced high-temperature reinforcement if provided at lower filler use levels. High aspect ratio needle-like calcium metasilicate, rod-like glass particles, and mica, at use levels in the 10 to 50 phr, provide sufficient translucency to be used for coating light-emitting devices, particularly incandescent bulbs.

Coatings on incandescent bulbs formed from the coating powders of the present invention are typically about 1 mil (25 microns) thick, but may range from 0.5 to 2 mils thick. As a standard, therefore, at 1 mil thickness, the coatings formed from the coating powders of the present invention should provide at least 50% light transmittance, preferably at least 80% light transmittance, although for the thinner coatings it may be possible to,use more opaque coatings. The fillers allow sufficient light transmittance but do impart some translucency. For un-colored coatings, the coating powders of the present invention should provide, at least 80% light transmittance at 1 mil thickness. Colored coatings containing high-temperature stable pigments will transmit less light, depending upon the type and amount of pigment.

Silicone resins self cure by the condensation of siloxyl (SiOH) end groups of silicone resins by the reaction:

Accordingly, the binder resin may be 100 wt % silicone without additional cross-linking agent. Silicone/glycidyl methacrylate coatings are described in Reisling (U.S. Pat. No. 4,887,837) and Eklund (U.S. Pat. No. 5,684,066) and silicone/acid-functional acrylic/triglycidyl isocyanurate compositions are described in Daly et al. (U.S. Pat. No. 5,422,396). The teachings of each of these patents is incorporated herein by reference. Organic resins in addition to the silicone resins are permissible in the coating powders of the present invention, providing such organic resins do not comprise more than 10 wt % of the binder system preferably no more than about 5 wt % of the binder system so as to minimize yellowing of the coating over time with high-temperature exposure. Such non-silicone resins include cross-linking agents such as those described above in U.S. Pat. Nos. 5,684,066 and 5,422,396 and resins added for purposes such as flow control, gas release, etc.

Preferred silicone resins have organic substitutents selected from the group consisting of phenyl, methyl, $C_2$ through $C_6$ alkyl and mixtures thereof. Preferred silicone resins have viscosities of between about 500 and about 10,000 cps at 150° C., most preferably 2000 to 5000 cps. The preferred silicone resins have condenseable hydroxyl contents of between about 2 and about 4.5 wt %, preferably from about 2 to about 3 wt. %. Preferred silicone resins have glass transition temperatures (Tg) of about 55° C. or above, preferably about 60° C. or above. Preferred silicone resins contain about 0.2% or less of organic solvents, more preferably about 0.1% or less.

Coating powders in accordance with the present invention are formed in a conventional manner. The components of the coating powder are batched and shaken, e.g., for 5 minutes, to blend well. The materials are then extruded, e.g., at 100° C. (230° F.) in a Buss single screw extruder, allowed to cool, chipped, ground and screened to obtain a powder of appropriate size. Average particle size is typically 20–80 microns. Scalping at 100 mesh is typical to remove coarse particles. There is typically about 10% by weight of particles below 10 microns. The amount of material retained on a 325 mesh is typically between about 30 to 50 wt. %. The powder is then applied in a conventional manner, e.g., electrostatically, to a substrate. The substrate is heated at the time of application and/or subsequently so that the coating particles form a continuous film, and, especially in the case of isocyanate-cured silicone resin adducts, effect the cure.

The invention will now be discussed in greater detail by way of specific examples.

RAW MATERIALS

Morkote S-101 A hydroxy-functional phenylmethylpolysiloxane resin manufactured by Morton International, Inc. This resin has a reactive hydroxyl content of approximately 2.3%, a viscosity at 150° C. of 2700 cP and a $T_g$ of 64° C.

Silres 601 A hydroxy-functional phenylpolysiloxane resin sold by Wacker Silicones.

GMA 300 An epoxy-functional acrylic sold by Estron Chemical.

Zinc Acetylacetonate A hydrated zinc enolate sold by GCA Chemical.

Zinc Neodecanoate A zinc alkylcarboxylate sold by OMG Americas.

Zinc Stearate Sold by Smith Chemical and Color.

Nyad 325 A 325 mesh wollastonite sold by Eastech Chemicals.

Orleans 325 A 325 mesh wollastonite sold by Ressources Orleans Inc.

Orleans 1 A 100 mesh wollastonite sold by Ressources Orleans Inc.

737 BC A chopped glass fiber sold by Owens Corning.

C-3000 Mica A muscovite mica sold by Eastech Chemicals.

Troy 486-CFL An acrylic flow aid sold by Troy Chemical Corp.

COMPARATIVE EXAMPLE 1

This comparative example illustrates a basic silicone binder system composed of heat-curable silicone resins with no curing agent or filler. The coating is smooth and nearly transparent, but is not useful as a coating because it is easily cracked by mechanical damage or heat exposure.

The components listed under Comparative Example 1 in Table 1 below were compounded, chilled, chipped, ground and sieved through a 200 mesh screen in the usual manner to prepare a coating powder. This powder was electrostatically sprayed onto the following substrates: 0.032 inch-thick mild steel panels "Q" panels, 0.011 inch thick black and white "opacity" panels, and 0.039 inch thick soft glass slides. The coating was cured in a 450° F. oven for 15 minutes. Properties and performance were measured on coatings which were 0.8 to 1.2 mils thick. Mechanical properties were measured on "Q" panels, color was measured on black and white "opacity" panels, and crack resistance over glass was measured on glass slides. Results are recorded in Table 2 below.

COMPARATIVE EXAMPLE 2

This example illustrates the performance of a coating which is not useful as a translucent, high temperature coating because it contains 10 parts of an acrylic curing agent. When exposed to 500° F. for 16 hours, the coating darkened ($\Delta L=-3.6$), and cracked. Exposure at 600° F. gave more darkening ($\Delta L=-6.8$) and cracking.

The components listed under Comparative Example 2 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

COMPARATIVE EXAMPLE 3

This example illustrates the performance of a coating which contains 60 parts of reinforcing filler, a filler quantity which is beyond that generally useful for translucent coatings. The high filler level produced a color difference from the unfilled control of $\Delta E=6.5$. The coating was severely textured, with a 60° gloss of 19).

The components listed under Comparative Example 3 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

COMPARATIVE EXAMPLE 4

This example discloses the performance of a coating which contains no reinforcing filler, but which is cured with zinc neodecanoate. It shows the smoothness and lack of bubbles and pinholes typical of zinc neodecanoate coatings, as well as the susceptibility to cracking on heat exposure of coatings containing no reinforcing filler. It was used as the color standard against which other coatings were compared. In contrast to the uncatalyzed coating, when tested for 16 hours at 500° F., cracking was not observed. When tested 16 hours at 600° F., however, large continuous cracks formed.

The components listed under Comparative Example 4 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 1

This example discloses the performance of a coating which contains 10 parts of reinforcing filler. As expected, the presence of the mica filler added color to the coating, a total color difference from the unfilled coating ($\Delta E$) of 2.8. The coating became more textured, as evidenced by a reduction of the 60° gloss from 104 to 86. No cracking was observed at 500° F. Cracks from 600° F. testing shrank to typical lengths of 0.1 to 0.3 mm and became discontinuous.

The components listed under Example 1 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 2

This example discloses the performance of a coating which contains 25 parts of reinforcing filler. As expected, the presence of the mica filler added color to the coating, $\Delta E=4.3$. The coating became more textured, as evidenced by a reduction of the 60° gloss to 68. Cracks from 600° testing shrank further to typical lengths of 0.02 to 0.1 mm.

The components listed under Example 2 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 3

This example discloses the performance of a coating which contains 40 parts of reinforcing filler. The additional mica added color to the coating, $\Delta E=7.1$. The coating became more textured, as evidenced by a reduction of the 60° gloss to 57. Cracks disappeared from the 600° test specimens entirely.

The components listed under Example 3 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

COMPARATIVE EXAMPLE 5

This example discloses the performance of a coating which contains 25 parts of a wollastonite reinforcing filler having a typical aspect ratio of 5 to 1. This filler caused a minimal color change from the unfilled system of $\Delta E=1.4$. Cracks after 600° F. testing were discontinuous but relatively large at lengths of 1–10 mm.

The components listed under Comparative Example 5 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 5

This example discloses the performance of a coating which contains 25 parts of a wollastonite reinforcing filler having a typical aspect ratio of 10 to 1. This filler caused a minimal color change from the unfilled system of $\Delta E=0.6$. Crack; after 600° F. testing were very small and few.

The components listed under Example 5 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 6

This example discloses the performance of a coating which contains 25 parts of a wollastonite reinforcing filler having an aspect ratio of 20 to 1. This filler caused a minimal color change from the unfilled system of $\Delta E=1.4$. Cracks after 600° F. testing were small and discontinuous.

The components listed under Example 6 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 7

This example discloses the performance of a coating which contains 10 parts of a wollastonite reinforcing filler having an aspect ratio of 20 to 1. This filler caused a minimal color change from the unfilled system of $\Delta E=0.9$. Cracks after 600° F. testing were of moderate size and discontinuous.

The components listed under Example 7 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

EXAMPLE 8

This example discloses the performance of a coating which contains 25 parts of a glass fiber reinforcing filler having an aspect ratio of 10 to 1. This filler caused a minimal color change from the unfilled system of $\Delta E=0.6$. Cracks after 600° F. testing were large and numerous. Resistance to cracking was only marginally increased with this reinforcing filler at this loading.

The components listed under Example 8 in Table 1 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 2.

TABLE 1

Compositions[1] in Parts

| Component | C. Ex. 1 | C. Ex. 2[3] | C. Ex. 3 | C. Ex. 4 | Ex. 1 | Ex. 2 | Ex. 3 | C. Ex. 5 | Ex. 5 | Ex. 6 | Ex. 7 | Ex. 8 |
|---|---|---|---|---|---|---|---|---|---|---|---|---|
| Morkote S-101[2] | 75 | 65 | 75 | 75 | 75 | 75 | 75 | 75 | 75 | 75 | 75 | 75 |
| Silres 601[2] | 25 | 25 | 25 | 25 | 25 | 25 | 25 | 25 | 25 | 25 | 25 | 25 |
| GMA-300[2] | — | 10 | — | — | — | — | — | — | — | — | — | — |
| Zinc neodecanoate[2] | — | — | 0.5 | 0.5 | 0.5 | 0.5 | 0.5 | 0.5 | 0.5 | 0.5 | 0.5 | 0.5 |
| Nyad 325 | — | — | — | — | — | — | — | 25 | — | — | — | — |
| Orleans 325 Wollastonite | — | — | — | — | — | — | — | — | — | 25 | — | — |
| Orleans 1 Wollastonite | — | — | — | — | — | — | — | — | — | — | 25 | 10 | — |
| C-3000 Mica | — | 40 | 60 | — | 10 | 25 | 40 | — | — | — | — | — |
| 737 BC Glass | — | — | — | — | — | — | — | — | — | — | — | 25 |

[1]Each coating also contained Troy 486-CFL[2], 2.0 phr; Benzoin, 0.8[2] phr.
[2]Binder components
[3]Comparative Example 2 has a binder silicone level of 87%. All other compositions contain about 3 wt % non-silicone resins as flow ads and thus had binder silicone levels of 97%.

TABLE 2

Performance

| Property | C. Ex. 1 | C. Ex. 2 | C. Ex. 3 | C. Ex. 4 | Ex. 1 | Ex. 2 | Ex. 3 | C. Ex. 5 | Ex. 5 | Ex. 6 | Ex. 7 | Ex. 8 |
|---|---|---|---|---|---|---|---|---|---|---|---|---|
| Gel Time (sec) | 300+ | 175 | 231 | 240 | 265 | 273 | 243 | 147 | 137 | 166 | 184 | 279 |
| Impact Resistance (in-lb) | <20 | 160 | 160 | 20 | 40 | 100 | 160 | 20 | 20 | 20 | <20 | 20 |
| Pencil Hardness | B | 2H | 2H | H | H | H | H | F | F | F | F | F |
| 60° Gloss (% Reflection) | 114 | 27 | 19 | 104 | 86 | 68 | 57 | 64 | 67 | 69 | 85 | 81 |
| Color Change (Compared to Ex. 1; white, ΔE)[1] 16 h, 500° F. Heat Age | lighter | 5.5 | 6.5 | — | 2.8 | 4.3 | 7.1 | 1.4 | 0.6 | 1.4 | 0.9 | 0.6 |
| Crack Quantity (per square mm)[2] | 1–10 | 1–10 | none | none | none | none | none | none | none | none | none | none |
| Crack Length (mm) | 1–5 | .02–1.0 | — | — | — | — | — | — | — | — | — | — |
| Darkening (ΔL)[3] 16 h, 600° F. Heat Age | — | −3.6 | — | — | — | — | 0.2 | — | — | — | — | — |
| Crack Quantity (per square mm)[2] | 1–10 | 60 | none | 2 | 30 | 60 | none | 20 | 5 | 25 | 15 | 20 |
| Crack Length (mm) | 1–10 | .02–.1 | none | 1–10 | .1–.3 | .02–.1 | none | 1–10 | .02–.1 | .2–.5 | .2–1.5 | 0.4–1.5 |
| Darkening (ΔL)[3] | — | −6.8 | — | — | — | — | −2.3 | — | — | — | — | — |

Notes:
[1]Measured on the CIELAB scale taking red-green, blue-yellow and black-white axis into account.
[2]Cracks were evaluated using a light microscope at 50X.
[3]Measured on the CIELAB scale where black is 0 and white is 100. The unit ΔL indicates the difference in darkness between the as-cured coating on a glass slide and a tested (heat-aged) slide.

EXAMPLE 9

This example discloses the performance of a coating which contains a preferred level of a reinforcing filler, but contains no curing agent. More and larger cracks were formed than were observed in coatings with cure catalyst in addition to filler, but fewer cracks were observed than in un-reinforced systems.

The components listed under Example 9 in Table 3 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 4.

EXAMPLE 10

This example discloses the performance of a coating which contains a preferred level of a reinforcing filler and a zinc alkylcarboxylate other than the necdecanoate. A few small cracks were observed on 600° F. testing.

The components listed under Example 10 in Table 3 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 4.

EXAMPLE 11

This example discloses the performance of a coating which contains 40 parts of mica reinforcing filler and the optional catalyst zinc acetylacetonate. No cracks were observed on either 500 or 600° F. heat exposure. When this catalyst was used with other filler combinations, pinholes were observed (See Example 12).

The components listed under Example 11 in Table 3 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 4.

EXAMPLE 12

This example illustrates the pinhole and bubble defects sometimes observed when the optional catalyst zinc acetylacetonate is used as the cure catalyst.

The components listed under Example 12 in Table 3 were compounded, chilled, chipped, ground and sieved through a 200 mesh screen in the usual manner to prepare a coating powder. This powder was electrostatically sprayed onto the various substrates, cured in a 450° F. oven for 15 minutes and tested as in Comparative Example 1. Results are recorded in Table 4.

TABLE 3

Compositions[1] in Parts

| Component | Ex. 9 | Ex. 10 | Ex. 11 | Ex. 3 | Ex. 5 | Ex. 12 |
|---|---|---|---|---|---|---|
| Morkote S-101 | 75 | 75 | 75 | 75 | 75 | 75 |
| Silres 601 | 25 | 25 | 25 | 25 | 25 | 25 |
| Zinc Acac | — | — | 0.5 | — | — | 0.5 |
| Zinc Stearate | — | 0.5 | — | — | — | — |
| Zinc neodecanoate | — | — | — | 0.5 | 0.5 | — |
| C-3000 Mica | 40 | 40 | 40 | 40 | — | — |
| Orleans 325 | — | — | — | — | 25 | 25 |

[1]Each coating also contained Troy 486-CFL, 2.0 phr; Benzoin, 0.8 phr.

TABLE 4

Performance

| Property or Performance Measure | Ex. 9 | Ex. 10 | Ex. 11 | Ex. 3 | Ex. 5 | Ex. 12 |
|---|---|---|---|---|---|---|
| Gel Time (sec) | 300+ | 300+ | 105 | 243 | 137 | 91 |
| Impact Resistance (in-lb) | <20 | <20 | 60 | 160 | 20 | 20 |
| Pencil Hardness | B | B | F | H | F | H |
| 60° Gloss (% Reflection) | 34 | 56 | 68 | 57 | 67 | 64 |
| Color Change (Compared to Ex. 1, white, ΔE)[1] 16 h, 500° F. Heat Age | 4.5 | 7.4 | 5.6 | 7.1 | 0.6 | 1.4 |
| Crack Quantity (per square mm)[2] | none | none | none | none | none | none |
| Crack Length (mm) | — | — | — | — | — | — |
| Darkening (ΔL)[3] 16 h, 600° F. Heat Age | — | -1.4 | — | 0.2 | — | — |
| Crack Quantity (per square mm)[2] | 20 | 10 | none | none | 5 | none |
| Crack Length (mm) | .2–.5 | <0.2 | none | none | .02–.1 | none |

TABLE 4-continued

Performance

| Property or Performance Measure | Ex. 9 | Ex. 10 | Ex. 11 | Ex. 3 | Ex. 5 | Ex. 12 |
|---|---|---|---|---|---|---|
| Darkening (ΔL)[3] | — | -1.6 | — | -2.3 | — | — |
| Pinholes | no | no | no | no | no | yes |

Notes:
[1]Measured on the CIELAB scale taking red-green, blue-yellow and black-white axis into account.
[2]Cracks were evaluated using a light microscope at 50X.
[3]Measured on the CIELAB scale where black is 0 and white is 100. The unit ΔL indicates the difference in darkness between an untested glass slide and a heat-aged one.

DISCUSSION OF THE EXAMPLES

The Effect of Resin on Color Stability, Table 5 Translucent coatings for light-emitting devices should suffer little color change on prolonged heat exposure. Most of the coatings described herein, such as Ex. 3., were formulated to maximize the silicone content of the binder. Comparative Example 2 is included to show the impact on color stability of including an organic curing agent.

TABLE 5

The Effect of Silicone Content on Color Stability

| Test | Ex. 3 | C. Ex. 2 |
|---|---|---|
| Silicone Fraction in Binder | 97 | 87 |
| Color Change on 16 h, 500° F. Exposure (ΔL)[1] | 0.2 | -3.6 |
| Color Change on 16 h, 600° F. Exposure (ΔL)[1] | -2.3 | -6.8 |

Notes:
[1]Positive values indicate lightening. Negative values indicate darkening.

The Effect of Filler on Color An attribute of any ideal coating, and especially of translucent coatings and coatings for light-emitting devices, is that obligatory components be colorless. The binder and any necessary reinforcing fillers should not affect coating colors. In several examples, mica was used as the reinforcing filler. At any level employed it was found to darken and brown the coating. This darkening is measurable even in Example 1, with 10 parts of mica, and becomes more noticeable as the mica level is increase through Examples 2 and 3 and Comparative Example 3. Note that a range of colors were measured at the mica level of 40, suggesting that the ΔE of 6.5 for Comparative Example 3 is within expected variation.

Micas of many degrees of whiteness are of course available, but it can be advantageous to use fillers with less inherent tendency to add color, such as wollastonite and glass fiber.

TABLE 6

The Effect of Filler on Color

| Component | CE 4 | Ex 1 | Ex 2 | CE 2 | Ex 3 | Ex 9 | Ex 10 | CE 3 | CE 5 | Ex 5 | Ex 6 | Ex 7 | Ex 8 |
|---|---|---|---|---|---|---|---|---|---|---|---|---|---|
| Nyad 325 | — | — | — | — | — | — | — | — | 25 | — | — | — | — |
| Orleans 325 Wollastonite | — | — | — | — | — | — | — | — | — | 25 | — | — | — |
| Orleans 1 Wollastonite | — | — | — | — | — | — | — | — | — | — | 25 | 10 | — |

TABLE 6-continued

The Effect of Filler on Color

| Component | CE 4 | Ex 1 | Ex 2 | CE 2 | Ex 3 | Ex 9 | Ex 10 | CE 3 | CE 5 | Ex 5 | Ex 6 | Ex 7 | Ex 8 |
|---|---|---|---|---|---|---|---|---|---|---|---|---|---|
| C-3000 Mica | — | 10 | 25 | 40 | 40 | 40 | 40 | 60 | — | — | — | — | — |
| Glass Fiber | — | — | — | — | — | — | — | — | — | — | — | — | 25 |
| Color Difference relative to Unfilled Comp. Ex. 4 (ΔE)[1] | — | 2.8 | 4.3 | 5.5 | 7.1 | 7.4 | 4.5 | 6.5 | 1.4 | 0.6 | 1.4 | 0.9 | 0.6 |

The Effect of Filler on Smoothness. Table 7 An important attribute of any coating, and especially of translucent coatings and coatings for light-emitting devices, is that the coating be smooth. A measure that can be used to characterize smoothness is gloss. Comparative example 4 shows the typical 60° gloss measure provided by a smooth, transparent coating over aluminum, 104. As mica is added through the series Ex. 1, 2, 3, and Comparative Example (CE) 3, smoothness decreases as reflected in the dropping gloss values of 86, 68, 57, and 19. This further illustrates the difficulties encountered when more than about 50 parts of filler are used. Comparative Example 5 and Examples 5, 6, and 8, show that wollastonites and glass fiber give similar loss of smoothness.

TABLE 7

The Effect of Filler on Smoothness as Seen in 60° Gloss

| Component | CE 4 | Ex 1 | Ex 2 | Ex 3 | Ex 9 | Ex 10 | CE 3 | CE 5 | Ex 5 | Ex 6 | Ex 7 | Ex 8 |
|---|---|---|---|---|---|---|---|---|---|---|---|---|
| Nyad 325 | — | — | — | — | — | — | — | 25 | — | — | — | — |
| Orleans 325 Wollastonite | — | — | — | — | — | — | — | — | 25 | — | — | — |
| Orleans 1 Wollastonite | — | — | — | — | — | — | — | — | — | — | 25 | 10 | — |
| C-3000 Mica | — | 10 | 25 | 40 | 40 | 40 | 60 | — | — | — | — | — |
| Glass Fiber | — | — | — | — | — | — | — | — | — | — | — | 25 |
| 60° Gloss | 104 | 86 | 68 | 57 | 34 | 56 | 19 | 64 | 67 | 69 | 85 | 81 |

Effects of Filler Level on Crack Resistance, (See Table 2) Even small amounts of reinforcing filler improve the resistance of these coatings to cracking when exposed to heat, as can be seen by comparison of the gross cracking of un-reinforced Comparative Example 4 with the much-reduced cracking of the 10 phr mica coating, Example 1 and the 10 phr Wollastonite coating, Example 7. As the filler level is raised, as in the mica series CE 4, Ex. 1, 2, 3, CE 3, cracking diminishes and disappears. This trend is repeated in the Wollastonite series CE 4, Ex. 7, 6, and in comparison of other wollastonite and glass examples, CE 5 and Ex. 5 and 8. to the unfilled CE 4.

Note that for many applications such as incandescent light bulbs, surface temperatures can vary widely between about 75° C. (167° F.) and 400° C. (752° F.). A coating may be useful even though it exhibits minor cracking after 600° F. testing.

Effects of Wollastonite Aspect Ratio. Table 8 Comparative Example 5 and Examples 5 and 6 illustrate the effect of Wollastonite aspect ratio (the ratio of length to width or diameter). As the ratio is doubled from 5:1 to 10:1 in Comparative Example 5 and in Example 5, crack resistance increases dramatically. There appears to be an optimum aspect ratio or particle size, as crack resistance falls somewhat with the larger particles in Example 6.

TABLE 8

The Effects of Aspect Ratio

| | Comp. Ex. 5 | Ex. 5 | Ex. 6 |
|---|---|---|---|
| Reinforcing Filler | Nyad 325 | Orleans 325 | Orleans 1 |
| Aspect Ratio | 5:1 | 10:1 | 20:1 |
| 16 h, 600° F. Heat Aging | | | |
| Crack Quantity (per square mm) | 20 | 5 | 25 |
| Crack Length (mm) | 1–10 | 0.02–0.1 | 0.2–0.5 |

Effects of Curing Agent. Table 9 Catalysts which promote cure improve the crack resistance of these coatings in several ways. For example, the tendency of films to crack on heat exposure is less for the catalyzed films Ex. 10, 11 and 3 than uncatalyzed film Ex. 9.

Although zinc acetylacetonate in Ex. 11 and zinc neodecanoate in Ex. 3 both improve the crack resistance of coatings filled with 40 phr mica, and have generally good appearance, this is not the case in coatings filled with lower levels of wollastonite. Ex. 5, containing 25 phr wollastonite and cured with zinc neodecanoate has a generally smooth appearance, while Ex. 12, cured with zinc acetylacelonate, exhibits large numbers of pinhole defects.

TABLE 9

Effects of Cure Catalysts on Performance and Appearance

| | Ex. 9 | Ex. 10 | Ex. 11 | Ex. 3 | Ex. 5 | Ex. 12 |
|---|---|---|---|---|---|---|
| Filler Type | C-3000 Mica | C-3000 Mica | C-3000 Mica | C-3000 Mica | Orleans 325 Wollastonite | Orleans 325 Wollastonite |
| Filler Quantity | 40 | 40 | 40 | 40 | 25 | 25 |
| Curing Agent | none | zinc stearate | zinc acac | zinc neodec | zinc neodec. | zinc acac |
| 16 h, 600° F. Heat Age | | | | | | |
| Crack Quantity (per square mm)[2] | 20 | 10 | none | none | 5 | none |
| Crack Length (mm) | .2–.5 | <0.2 | none | none | .02–.1 | none |
| Pinholes | no | no | no | no | no | yes |

Coated Light-Emitting Devices

EXAMPLE 13

The following components were combined in a plastic bag, shaken for thirty seconds to make a raw mix.

| Component | Parts |
| --- | --- |
| Morkote S-101 | 75 |
| Silres 601 | 25 |
| Zinc Acetylacetonate | 0.5 |
| Troy 486 CFL | 2.0 |
| Benzoin | 0.8 |
| Orleans 325 | 35 |
| Heliogen Blue Pigment (BASF Corp.) | 4.0 |

The raw mix was extruded and cooled between chilled rollers to form chips. To these chips was added 0.2 wt. % aluminum oxide dry flow additive (Charles Wagner Co. Philadelphia). The chips were ground to a powder and sieved through a 200 mesh screen to form a coating powder.

Using this powder, PAR-type 85 watt flood lights manufactured by General Electric were coated as follows:

(1) Clean bulbs by wiping with methylethylketone.
(2) Preheat at 400° F. for 3 minutes.
(3) Coat by electrostatic spray in a grounding jig to a coating thickness of 0.8 to 1.0 mils.
(4) Cure 15 minutes at 450° F.
(5) Remove bulb from the oven and allow to air cool.

What is claimed is:

1. A coating powder composition comprising,
a binder resin system, between about 90 and 100 wt % of said binder resin system comprising silicone resin, and
between about 0.05 and about 3 wt % of a silicone cure catalyst which is a zinc dialkylcarboxylate, wherein the dialkylcarboxylate moieties of said zinc dialkylcarboxylate are branched at the carbon alpha to the carboxylate group.

2. The composition according to claim 1 wherein said zinc dialkylcarboxylate is zinc neodecanoate.

3. A light emitting device having a coating formed from a coating powder of a composition comprising
a binder resin system, between about 90 and 100 wt % of said binder resin system comprising silicone resin,
between about 10 and about 50 parts per hundred resin by weight of a filler selected from the group consisting of mica, calcium metasilicate, glass particles, and mixtures thereof, said filler having aspect ratios between about 8 and about 40, and
up to about 3 wt % of a silicone cure catalyst.

4. The composition according to claim 3 wherein said coating, at a thickness of 1 mil, provides light transmittance of at least about 50%.

5. The composition according to claim 3 wherein said coating, at a thickness of 1 mil, provides light transmittance of at least about 80%.

6. A coating powder composition comprising,
a binder resin system comprising silicone resin,
between about 0.05 and about 3 wt % of a silicone cure catalyst which is a zinc dialkylcarboxylate, and
between about 10 and about 50 parts per hundred resin by weight of a filler selected from the group consisting of glass particles, mixtures thereof with mica, and mixtures thereof with calcium metasilicate, said filler having an aspect ratio of between about 8 and about 40.

7. A coating powder composition as claimed in claim 6, wherein the dialkylcarboxylate moieties of said zinc dialkylcarboxylate are branched at the carbon alpha to the carboxylate group.

8. A device as claimed in claim 3, wherein in said composition said filler is present in an amount of between about 20 and about 40 parts per hundred resin by weight.

9. A device as claimed in claim 3, wherein in said composition said filler is wollastonite.

* * * * *